UNITED STATES PATENT OFFICE.

CORNELIUS J. MARVIN, OF LOS ANGELES, CALIFORNIA, ASSIGNOR TO THE BRAUN CORPORATION, OF LOS ANGELES, CALIFORNIA, A CORPORATION OF CALIFORNIA.

PROCESS OF GENERATING HYDROCYANIC-ACID GAS.

1,214,206.     Specification of Letters Patent.     Patented Jan. 30, 1917.

No Drawing.     Application filed February 13, 1915. Serial No. 7,975.

*To all whom it may concern:*

Be it known that I, CORNELIUS J. MARVIN, a citizen of the United States, and a resident of Los Angeles, county of Los Angeles, and State of California, have invented a new and useful Process of Generating Hydrocyanic-Acid Gas, of which the following is a specification.

The invention relates to a process of generating hydrocyanic acid gas for the purpose of fumigating citrus and other trees and for other purposes.

An object of the invention is to provide a process of generating hydrocyanic acid gas.

Heretofore, hydrocyanic acid gas for use in tree fumigation has been generated by mixing or bringing together sulfuric acid and a solution of potassium or sodium cyanid in water. These two substances have been brought into contact in a closed vessel and the gas evolved was conveyed from the vessel through a hose, the discharge end of which was placed under a tent covering the tree to be treated. The sulfuric acid heretofore used has been concentrated commercial sulfuric acid and the use of this concentrated acid has produced many deleterious features, which it is the object of this invention to overcome.

When concentrated sulfuric acid is employed, there are marked and violent fluctuations in the amount of gas discharged from the generating vessel. These fluctuations are due mainly to the fact that the concentrated sulfuric acid decomposes the hydrocyanic acid gas as it is liberated from the alkali metal cyanid. Some of the elements into which the gas is decomposed by the strong acid are retained in the liquid in the vessel, thereby causing a reduction in the amount of hydrocyanic acid gas delivered. The decomposition of the hydrocyanic acid gas by the strong sulfuric acid also causes the formation of ammonia and carbon monoxid, causing a further waste of the hydrocyanic acid gas. The ammonia is also harmful to the trees which are being treated.

In accordance with my invention, I generate the hydrocyanic acid gas by bringing together dilute sulfuric acid and the alkali metal cyanid solution or the alkaline earth metal cyanid solution, preferably the former, in a suitable vessel. The dilute acid consists preferably of one part concentrated acid and one part water and the cyanid solution consists preferably of two parts of water by measure to one part of alkali metal cyanid by weight. In generating the gas, I find that approximately one part of the dilute acid combines with three parts of the cyanid solution.

By employing the dilute acid with the cyanid solution, no decomposition of the hydrocyanic acid gas takes place after it has been generated and consequently there is a greater amount of available hydrocyanic acid gas, and there is a much smaller retention of gas in the residual liquor. In practice I usually place a comparatively large amount of the dilute acid in the generating vessel and add thereto a charge of cyanid solution, sufficient to produce the proper amount of gas for the fumigation of the trees under treatment. These charges are preferably added in rapid succession until the dilute acid in the vessel has been exhausted, after which the residual spent liquor is removed and another charge of dilute acid introduced.

When the concentrated acid and the water are mixed, there is produced a large amount of heat which raises the temperature of the mixture, and this increased temperature facilitates the production of hydrocyanic acid gas when the cyanid solution is introduced. The increased temperature also prevents the reabsorption of the hydrocyanic acid gas in the dilute acid, after it has been generated, and thus increases the amount of gas delivered from the generator. Preferably the acid is diluted in the generator, in order that the entire amount of heat produced be retained therein. I prefer to dilute the acid immediately before the machine is to be operated in order that the heat produced be utilized before it has an opportunity to escape by radiation. After the machine is put in operation the high temperature is maintained by the reaction of the acid with the cyanid solution.

When dilute acid is used, the reaction with the cyanid solution is less violent than when concentrated acid is used. The amount of boiling and sputtering is greatly reduced and consequently the entrainment of particles of acid in the gas is minimized. On account of these conditions, a smaller generating vessel may be employed and therefore a smaller amount of hydrocyanic acid gas is required to displace the air originally contained in the generator.

In carrying out the process described herein, potassium or sodium cyanid belonging to that group classed as alkali metal cyanids, is contemplated as the usual source of the cyanid solution, but it is to be understood that certain of the alkaline earth metal cyanids, especially that of calcium, may also be used. Therefore, in the claims succeeding this description I have used the term "cyanid solution" or "solution of cyanid" to include a solution of either an alkali metal cyanid or an alkaline earth metal cyanid.

I claim:

1. The process of generating hydrocyanic acid gas which consists in bringing together a hot dilute acid and a cyanid solution.

2. The process of generating hydrocyanic acid gas which consists in bringing together hot dilute sulfuric acid and a cyanid solution.

3. The process of generating hydrocyanic acid gas, which consists in bringing together hot dilute sulfuric acid, formed by mixing sulfuric acid and water in approximately equal parts and a solution of cyanid consisting of one part cyanid and two parts water.

4. The process of generating hydrocyanic acid gas which consists in bringing together water and concentrated sulfuric acid, whereby a dilute acid is formed and heat is generated which warms the dilute acid and adding a solution of cyanid to the dilute acid while the latter still retains the heat of dilution.

5. The process of generating charges of hydrocyanic acid gas which consists in placing an amount of hot dilute sulfuric acid in a vessel and successively adding thereto predetermined charges of cyanid solution, each charge being small as compared with said amount of acid.

6. The process of generating in rapid succession controlled quantities of hydrocyanic acid gas which consists in placing an amount of hot dilute sulfuric acid in a vessel and at short intervals of time, successively adding thereto measured charges of cyanid solution, each charge being small as compared with said amount of acid.

7. The process of generating hydrocyanic acid gas for fumigating in rapid succession a large number of trees which consists in placing in a vessel a quantity of hot dilute acid sufficient for all the trees and adding thereto individual measured charges of a cyanid solution, each charge being sufficient to produce the required amount of gas for one tree.

In testimony whereof, I have hereunto set my hand at Los Angeles, California, this 6th day of February 1915.

CORNELIUS J. MARVIN.

In presence of—
Wm. Kennedy,
H. D. Mackinnon.